C. RINGWALD

Feb. 21, 1933. FUSE Re. 18,743

2 Sheets-Sheet 1

Original Filed Dec. 23, 1927

Witness:

William P. Kilroy

Inventor:

Clarence Ringwald

Mauro Jackson,

Boutwell & Denner

Attys.

C. RINGWALD

Feb. 21, 1933. FUSE Re. 18,743

2 Sheets-Sheet 2

Original Filed Dec. 23, 1927

Witness:
William P. Kilroy

Inventor:
Clarence Ringwald
By Brown Jackson Boettcher Dienner
Attys

Reissued Feb. 21, 1933

REISSUED

Re. 18,743

UNITED STATES PATENT OFFICE

CLARENCE RINGWALD, OF NORTH HAMPTON, OHIO, ASSIGNOR, BY MESNE ASSIGNMENTS, TO SCHWEITZER & CONRAD, INC., OF CHICAGO, ILLINOIS, A CORPORATION OF DELAWARE

FUSE

Original No. 1,862,317; dated June 7, 1932, Serial No. 242,137, filed December 23, 1927. Application for reissue filed August 22, 1932. Serial No. 629,945.

My invention relates to electric fuses and the like.

In protective schemes for preventing excessive current flow, it has come to be generally recognized that the most simple and reliable indication of excessive current flow is the liberation of heat. The fusible link has become the recognized standard protective device for relatively low current flow circuits and is also in large use for currents of high amperage, regardless of voltage.

Where the power becomes relatively great, or the current flow relatively great, other protective means are more generally employed. The chief reason for this distinction resides in two things: first, the amount, i. e., the mass of metal which will be blown, i. e., fused and vaporized, and, second, the limiting strength of the circumambient medium, i. e., air, in the case of the usual small unfilled fuse.

Numerous schemes have been devised for increasing the distance between terminals when the fuse blows so as to diminish the amount, i. e., mass of metal to be blown to give a certain clearance. Also various schemes of providing a surrounding envelope of a medium of higher dielectric strength than air have been proposed. In some cases both means have been provided.

My invention, while it may be embodied in a fuse wherein the terminals are separated to a greater extent upon blowing of the fusible element, is primarily concerned with the provision of a surrounding medium of greater strength than air and which has certain inherent beneficial effects in the extinction of an arc and in the application of this medium to the container so as to maintain the desired relation between this substance and the active fuse element.

Where a mass of metal between two conducting terminals is vaporized, a flow of conducting electrons appears to be maintained. In the case of metal vapors, the conduction appears to occur very much as in the case of solid conductors, i. e., by a flow of electrons through the adjacent molecules. In the case of the breakdown of air, it appears that there are two things which conduct the current flow. First, the molecules of gas are broken down to force electrons from their orbits, and, second, a certain amount of metal vapor is freed from the terminals. In the case of a corona or brush discharge substantially no metal vapor is released and, hence, a relatively high resistance is maintained in the arc or spark. If the metal vapor can be kept from forming, or if it could be eliminated, the air would continue to afford a fairly high resistance, even though it were broken down.

I have conceived the possibility of surrounding the arc with a substance which will initially afford a high resistance to current flow, i. e., constitute of itself an excellent insulating medium of very high dielectric strength, and which, in conjunction with the vaporized metal of the electric arc, will tend to react to form a compound of such high resistance as to bind the electrons in unions which will resist disruption and, hence, resist current flow with consequent stoppage of the arc.

Such compounds are generally disintegrated in the electric arc and, hence, if chilling can be occasioned at the same time that the compounds are formed, or if the energy of the arc can be sufficiently dissipated to let these compounds cut down the flow of current, the arc can be extinguished in a simple and efficacious manner.

For example, assume that when a metal vapor is formed I could combine the metal with oxygen to form a high resistance oxide. If this reaction could be carried on more rapidly than metal vapor could be released, it will be possible at once to snap out an arc positively and effectively.

So far, I have not found it possible in atmospheric air to provide sufficiently rapid oxidation and chilling to secure this result. With a suitable circumambient medium it can be done.

One difficulty with plain oxidation is the fact that the reaction of free oxygen with the usual metals is exothermic, with the result that undesirable heat is liberated adding to the violence of the explosion.

I have conceived the possibility of liberating or releasing from a suitable compound the reagent which is to unite with the metal by means of an endothermic reaction. This compound, as above explained, should be a high dielectric affected only by the heat of the arc and resistant of itself to current flow.

The reagent which I have thus far employed successfully is chlorine. Chlorine reacts with metals in vapor form with great rapidity. I see no reason why other halogens should not operate equally well and shall shortly conduct experiments to determine the suitability of the rest of the halogen group. I conceive fluorine, which is more active than chlorine, will perhaps give superior results. Bromine may also be used.

The particular substance which I have thus far successfully employed in carrying out my invention is chlorinated naphthalene, which is now found on the market under the trade name of Halowax. It appears on the market in various grades including a liquid and a solid or wax form.

Now in order to teach those skilled in the art how to practice my invention, I shall describe in conjunction with the accompanying drawings specific embodiments of my invention.

In the drawings:—

Figure 1:
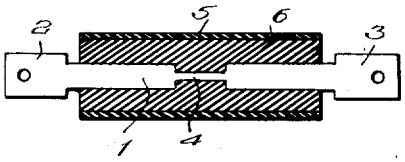
Fig. 1 is a longitudinal section through a simple elementary form of a device embodying my invention.

Referring now to Fig. 1, I show therein a metal fuse element 1 having the enlarged terminals 2—3 and having a link 4 of reduced cross section preferably at the central part of the fuse. The link 4 and the adjacent portions of the fuse are contained within a sleeve 5 which is preferably made of fiber or paper impregnated with a wax-like compound which, upon being heated frees chlorine or other halogen for cooperation with the metallic vapor of the fuse.

Within the sleeve or tube 5 there is a filling 6 of the same wax-like material.

The substance which I have successfully utilized for this purpose is chlorinated naphthalene, which I am able to secure on the open market under the trade name of "Halowax". This material looks much like paraffin, having sometimes a slightly yellowish tinge; it has a high dielectric strength of the order of 250 to 1000 volts per mill in small film. Its melting point is around 190 to 205 degrees F. Its boiling point is from 610 to 650 degrees F. Its resistivity is of the order of $1500 \times 10^{10}$ ohms per inch cube. Its specific gravity is about 1.589. When brought to the boiling, or approximately the boiling point, it has low viscosity and readily penetrates fibrous bodies. At all normal temperatures and under normal conditions it is neutral and noncorrosive in respect to metals. It is soluble in practically all organic solvent liquids and oils when heated therewith. It is insoluble in caustic alkaline and acid solutions except those that are powerful oxidizers. It is anhydrous and non-hygroscopic and therefore will not draw or support a film of moisture. It is in its crystallization or in its solid form entirely free of moisture. It is a relatively soft solid, crystalline and translucent.

The chlorinated naphthalene may be secured in various grades, but the above form is the preferred form, since the solid form holds its shape under all normal atmospheric conditions.

The paper or fibrous sleeve 5 is boiled in the chlorinated naphthalene to impregnate the same.

Figure 2:
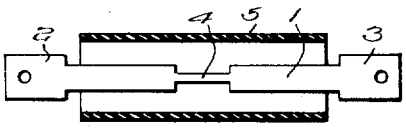
Fig. 2 is a similar view of a modification.

In Fig. 2 I have shown the elements of a fuse in which the sleeve 5 impregnated with chlorinated naphthalene is used alone, the heat of the arc caused by volatilizing of the fusible link 4 driving some of the arc extinguishing substance from the impregnated walls of the tube 5 to fill the said tube 5 with active vapor. If desired, the ends of the tube 5 may be obstructed to assist in this action, or they may be completely closed upon the body of the fuse.

In the form shown in Fig. 1, the outer sleeve 5 may be made of other material, since the mass 6 of chlorinated naphthalene serves to perform the desired function of extinguishing the arc independently of the evolution of any vapor or gas from the sleeve or envelope 5.

In Figs. 3 to 6 I have shown a commercial form of cartridge fuse embodying my invention. In this form the outer protective sleeve 7 is preferably a bakelite tube or a tube of fiber impregnated with bakelite or the like. The ends of the tube 7 are threaded as indicated at 8 and 9 and in each end transverse slots 10—11 are cut across the edge or margin of said sleeve 7.

Figure 3:
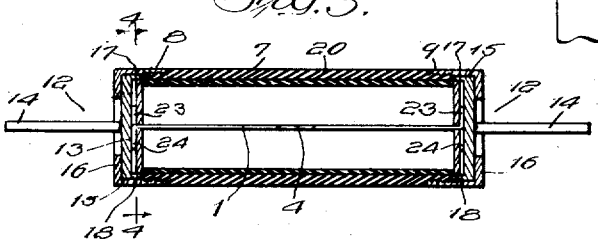
Fig. 3 is a longitudinal section of a fuse embodying my invention.
Figure 4:
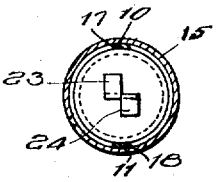
Fig. 4 is an end view of the same with the end cap removed as though taken on the line 4—4 of Fig. 3.
Figure 5:
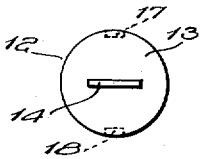
Fig. 5 is an end view of the terminal as though viewed from the left of Fig. 3.
Figure 6:
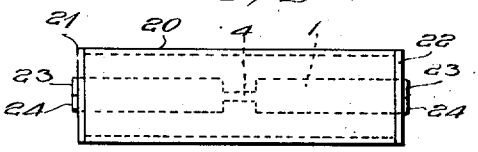
Fig. 6 is a side elevational view of the active fuse element employed in Fig. 3.
Figure 7:
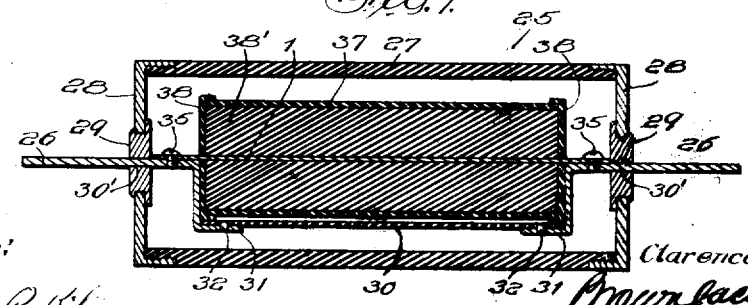
Fig. 7 is a longitudinal section of a modified embodiment of my invention.

An end plate member 12 having the disc 13 and the knife blade contact 14 is seated upon the end of the sleeve 7 at each end. A flanged ring 15 having the inturned margin 16 embraces the edges of the disc member 13 and is threaded down onto the threads 8, as shown in Fig. 3. The disc member 13 has two key members 17 and 18 adapted to enter the slots 10 and 11 so as to anchor the knife blade member 14 rigidly in predetermined alignment. The construction of the sleeve 7 and of the terminal members cooperating therewith is identical at each end. The active element within the outer shell comprises a sleeve 20 preferably made of paper or fiber impregnated with chlorinated naphthalene of the character above described. A pair of discs 21 and 22 cover the ends of the sleeve 20 and these discs are slotted to receive the fusible element 1 having the reduced cross section link 4. The ends of the fuse 1 extend through the discs 21 and 22 and are clinched or bent over as shown in Fig. 4. For the purpose of equalizing the bearing of the disc member 13 against said clinched end, the end of the fusible element 1 is preferably split and the two ends are bent over in opposite directions as indicated at 23 and 24 in Fig. 4. It can now be seen that the renewable element shown in Fig. 6 may be inserted inside the outer sleeve 7, the flanged ring 15 and the terminal element 12 being removed. The clinched ends 23—24 bear against the disc or plate portion 13 of the terminal element 12 at each end, and when the ring 15 is screwed down contact is thereby made between said ends of the fuse and the knife blade terminals 14—14.

In Figs. 7 to 10 I have illustrated a cartridge form of fuse with renewable element more particularly adapted for larger capacities. In this form I provide an outer casing 25 from which the knife blade terminals 26—26 project. The outer casing 25 comprises a sleeve 27 preferably made of bakelite or bakelized fiber having its ends threaded to receive the caps 28—28, these caps being threaded to cooperate with the ends of the tube 27. The caps 28—28 contain central slotted disc members 29—29 having a slot 30′ therethrough for receiving the knife blade terminals 26—26. These slotted discs 29 are rotatable in the cap members 28—28. The cap members 28 may be of metal or they may be of bakelite or bakelized fiber or the like.

While both discs 29—29 are herein shown as rotatable, obviously one of them may be anchored and be non-rotatable with respect to its cap 28 if so desired. Also it will be apparent that if desired the caps 28 may be formed into the shape of flanged rings only, as shown in Fig. 3, and the discs 29—29 extended out to rest upon the ends of the sleeve 27 is so desired. The knife blade terminals 26—26 extend inwardly towards each other at their inner ends, and these inner ends are shaped to form semi-cylindrical sockets to receive a cradle member 30 which is preferably a semi-cylindrical sleeve of hard fiber or the like. This sleeve of hard fiber 30 is secured to the semi-cylindrical ends 31—31 of the knife blade terminals 26—26 by tubular rivets or the like, as indicated at 32—32.

Preferably the knife blade terminals 26—26 and the semi-cylindrical socket members 31 are formed integrally of a stamping of copper or brass. The shank of the knife blade contacts 26 adjacent the sockets 31—31 is enlarged to form shoulders 33—33 for limiting the endwise motion of the cradle in the outer casing 25.

Figure 9:
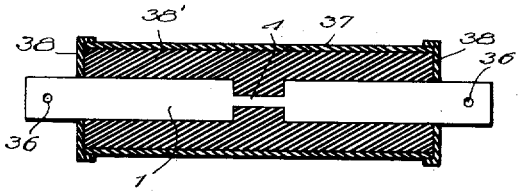
Fig. 9 is a longitudinal section view of the active element shown in Fig. 7.
Figure 10:
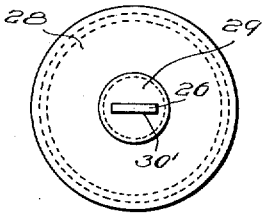
Fig. 10 is an end view of one of the caps of the outer shell of the fuse shown in Fig. 7.

These shank members are also provided with threaded openings 34—34 for receiving clamping screws 35, the said clamping screws being adapted to pass through holes 36—36 in the ends of the active element shown in Fig. 9. The renewable element comprises the fuse 1 preferably having link of reduced cross-section 4 enclosed in an outer shell or casing 37 having end caps 38—38.

The end caps and the shell 37 may be made of paper or fiber impregnated with chlorinated naphthalene, and the said fuse element 1 supported in said end caps, which are in turn connected together to the end sleeve 37. If desired a filling 38′ of the solid wax-like chlorinated naphthalene may be employed within the sleeve 37.

Figure 8:
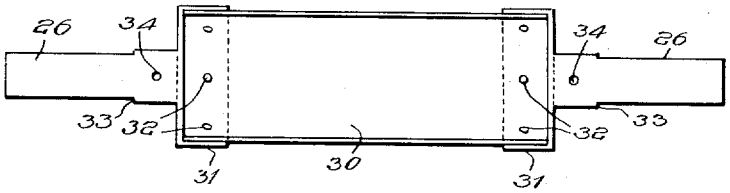
Fig. 8 is a plan view of the holder for the active element.

For the renewal of the active fuse element, the renewable member is released at the screws 35—35 and a new element dropped into the cradle shown in Fig. 8, whereupon the ends of the fuse 1 are clamped by the screws 35, then one end or knife blade terminal 26 is passed through a slot in the disc 29, then the cap at the opposite end with its disc 29 is passed over the adjacent knife blade contact 26 and the cap member 28 is screwed up tight on the outer sleeve 27.

Figure 11:
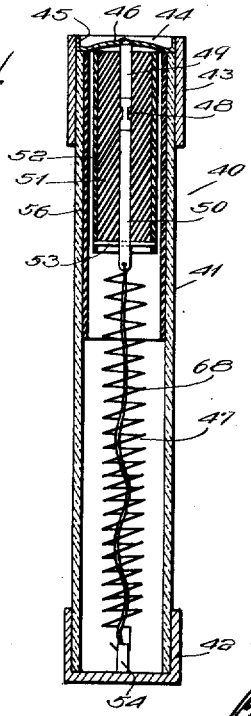
Fig. 11 is a longitudinal sectional view of a spring operated fuse embodying my invention.

In Fig. 11 I have shown a fuse in which the fuse terminals are separated by means of a spring when the fuse element melts. In this case I provide an outer container formed of a piece of glass tubing 41 which has a cap 42 preferably of brass cemented upon the lower end of the same or otherwise suitably secured thereto, and a sleeve or ferrule 43 cemented or otherwise secured to the upper end thereof. The sleeve 43 extends beyond the end of the glass sleeve 41 to provide a seat for the disc-like cap member 44 which preferably has a flange 45 turned up around the rim of the same to provide a wider sealing surface. The central part of the cap 46 is preferably bowed up, and under the tension of the spring 47, which acts upon it, this central arched portion 46 is pulled downwardly, tending to spread the edges of the disc into the side engagement with the counterbore of the ferrule 43.

The fuse element comprises a link 48 preferably having a small cross-section at the point where the blowing is to occur, and connected to suitable metallic terminals 49 and 50. These terminals and the fuse element are imbedded in a mass or filling 51 of chlorinated naphthalene in wax form, said filling being contained within a sleeve 52 formed of fiber or paper impregnated with the same substance. The terminal 50 is connected to the sleeve 52 by a transverse pin 53 extending through both of said elements. The spring 47 is secured to the lower end of the terminal member 50 and to an anchor 54 formed on the cap member 42. The spring 47 is placed in tension and the upper terminal member 49 is passed through an opening in the cap member 46 and is there anchored as by soldering or by forming a button or the like upon the end of the terminal 49 which is then drawn down tight into engagement with the edges of the hole formed in the cap member 44.

It is not essential that the casing be absolutely fluid tight, but it is desirable that it be so to the extent of excluding moisture.

Upon blowing of the fusible portion 48, the arc extinguishing material, i. e., the chlorinated naphthalene, is immediately available to attack the substance of the arc and form with it non-conducting compounds, which, being chilled by the presence of the mass of material and the sleeve outside of the same, becomes a non-conductor of electricity. At the same time, the terminals are separated to increase the length of the arc and, hence, its vulnerability to attack. The sleeve 52 with its filling 51 of chlorinated naphthalene is drawn down with the spring 47 so that the movable terminal 50 is surrounded by a bath or mass of the chlorinated naphthalene regardless of the position of the fuse.

Obviously, the upper end of the sleeve 52 might be attached to the cap member 44, and the terminal 50 pulled down through the mass of arc extinguishing material, but this would expose the glass sleeve 41 to the heat of the arc directly, and that is not desirable.

To avoid exposing the upper end of the glass sleeve to the heat of the arc, I provide a sleeve or lining 56 of paper or fiber impregnated with chlorinated naphthalene at the upper end of the glass sleeve where the glass might be exposed to the arc by a downward movement of the movable sleeve 52. If the arc persists until one of the terminals 49 or 50 are withdrawn from the tubular member 52, the arc then occupies the larger bore in the tubular member 56 and the arc extinguishing material carried by the member 56 is acted upon by the arc to evolve gaseous arc extinguishing medium therefrom which tends to fill the space occupied by the arc. If the cap 44 has been blown off, the gaseous medium sweeps endwise out of both the tubular members 52 and 56 to atmosphere.

Obviously, as soon as the tension of the spring leaves the disc 44, its tendency to bind the counterbore of the ferrule 43 is reduced, and any tendency to form high pressure within the outer casing 40 will result in blowing off the cap or disc 44 and relieving the pressure.

The fuse may be refilled by supplying a new terminal 50 and attached sleeve 52 and filling 51 with the fusible element 48 and terminal 49. Preferably the spring 47 is shunted by a flexible conductor.

Figure 12:
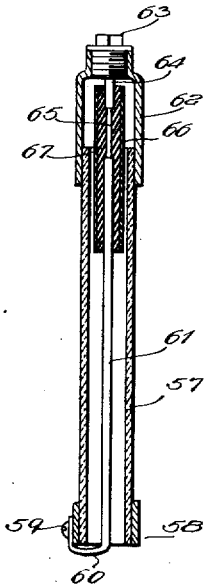
Fig. 12 is a longitudinal sectional view of an expulsion type of fuse embodying my invention.

In Fig. 12 I have shown an expulsion type of fuse embodying my invention. In this case I employ a sleeve of insulation as shown at 57, this sleeve being formed of bakelized fiber, porcelain or glass. To the lower end of the sleeve 57 there is attached a ferrule 58 with a terminal screw 59 for clamping the lower end 60 of the flexible fuse terminal 61 to the ferrule 58. To the upper end of the sleeve 57 I connect an explosion chamber member 62. This is preferably formed of a metal casing cemented or otherwise secured upon the upper end of the sleeve 57 and having a threaded opening at its upper end in alignment with the bore of the tube 57 and normally closed by a threaded plug 63. To the threaded plug 63 on its lower end I connect a fuse terminal 64, and between the fuse terminal 64 and the fuse terminal 61 a fusible link 65 is connected. On the outside of the lower end of the terminal 64 and the upper end of the terminal 61 I mount a sleeve 66 of paper impregnated with and filled with a mass of chlorinated naphthalene as indicated at 67.

Upon blowing of the active element 65 the arc which is formed is immediately attacked by the arc extinguishing material in solid form, which, by the heat of the arc, is melted and vaporized to some extent. The pressure which results from the formation of the arc expels or in part expels the paper sleeve 66 with its filling 67 of wax-like arc extinguishing material. If the exploson is particularly violent the entire sleeve with its mass of material and the terminal 61 may be expelled through the sleeve 57.

The fuse may be refilled by removal of the threaded plug 63 and loosening of the terminal 59 to release the portion 60 of the flexible terminal and an entirely new fuse and terminal attached to a plug such as 63, dropped down through the open end of the chamber 62, and down through the sleeve 57. The upper terminal 64 may be fixedly secured to the plug 63 or releasably secured to the same, this feature being optional.

In all of the forms illustrated, the arc is brought into contact with a mass of chlorinated naphthalene preferably in the solid form. Obviously within my invention the liquid form may be employed, care being taken to make the container sufficiently tight to retain the liquid form. The contact of the heat of the arc with the chlorinated naphthalene dissociates and the halogen element thereof attacks the metal vapor of the arc, forming non-conducting compounds which, being chilled and stabilized by the surrounding relatively cold mass, do not further disintegrate under the electric arc, with the result that the fuse effectually prevents sustained current flow.

Figure 13:
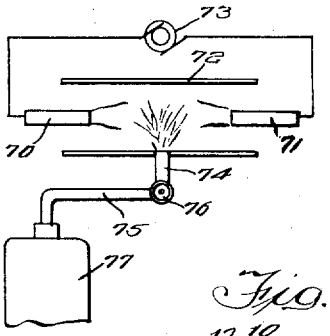
Fig. 13 is a diagram illustrating the fundamental method involved in the extinguishment of an arc in accordance with my invention.

To illustrate the fundamental action involved, I show in Fig. 13 diagrammatically two metallic terminals 70 and 71 between which an arc is formed within the sleeve or housing 72 by current supplied through a suitable source as indicated at 73. An inlet nozzle 74 is directed into the space in which the arc is formed and this is connected by a pipe 75 through a control valve 76 with a tank of chlorine gas under high pressure, as indicated at 77. Assume that the arc is formed between the terminals 70 and 71 in a relatively confined space. I thereupon admit at high velocity and at relatively high pressure chlorine gas which displaces the atmospheric air tending, by its chilling effect, to reduce the temperature within the container 72 and tending, by its chemical effect, to combine with the metal which is in extremely susceptible form to chemical action, whereby non-conducting compounds are formed faster than metal can be liberated from the terminals 70 and 71, with the result that the arc is extinguished.

It will be seen that it is desirable to employ as an active element a material which will have the ability to attack the active metal or other conducting substance in the arc at a temperature less than the temperature of the electric arc and with great rapidity.

Preferably such action should not add heat to the mass, but should require a temperature less than the temperature of the arc for its best or optimum condition. The chlorinated naphthalene requires heat to break it down to free the chlorine, and this, therefore, forms an ideal combination, since the reaction is endothermic to the extent of requiring the heat of the arc to liberate the chlorine, which chlorine in turn attacks the arc to form a compound which is non-conducting, or relatively so, and which, due to the extraction of heat therefrom, becomes stabilized and will not again dissociate.

I do not intend to be limited to the details shown and described, nor to the specific material which I have above described in detail, since I am convinced by my experiments that fluorine, as an active element, would be even more effective for this purpose.

It may be that other negative elements or radicals combining with the metal of the fuse will be equally effective in forming a non-conducting compound to extinguish the arc, and these, if discovered, I beg to insert in this description hereafter as coming within the broad scope of my invention.

Preferably the metals which I employ for the fusible link are such as aluminum, zinc, tin and lead, which are very quickly attacked by the halogen group, but I do not wish to confine myself to these metals, since, at the heat of the electric arc, all of the ordinary baser metals combine readily with the more active halogens.

I claim:—

1. In a fuse device, the combination of a container comprising an outer sleeve of condensation product and an inner lining of fiber impregnated in a solid waxy halogen derivative of naphthalene, and a fusible link within said container.

2. In combination, an outer sleeve having a metallic cap at one end, a metallic ferrule at the other, said ferrule having a portion extending beyond the end of the sleeve, a removable closure for said end of the ferrule, a spring secured to the cap within the sleeve, a pair of terminals, one of which is connected to the spring, the other of which is connected to the ferrule, a fusible link between said terminals and a filling of solid arc extinguishing material surrounding said fusible link, said material being converted from solid to liquid and from liquid to gas by absorption of the heat of the arc formed when said link ruptures to quench that arc.

3. In combination, an outer sleeve having a metallic cap at one end, a metallic ferrule at the other, said ferrule having a portion extending beyond the end of the sleeve, a removable closure for said end of the ferrule, a spring secured to the cap within the sleeve, a pair of terminals, one of which is connected to the spring, the other of which is connected to the ferrule, a fusible link between said terminals and a filling of solid arc extinguishing material surrounding said fusible link, an inner sleeve for containing said solid mass of arc extinguishing material, said inner sleeve being connected to the spring and movable thereby together with the movable terminal, and a third sleeve impregnated in said arc extinguishing material and interposed between said inner and outer sleeves to protect the latter from rupture when said link is ruptured.

4. In combination, an outer sleeve element, closure members for each end of the sleeve, a pair of terminal members electrically connected to each of the closure members, one of said terminal members being movable, a spring connected to the movable terminal member for separating it from the other terminal member, means for supporting a mass of solid arc extinguishing material around said terminals, a fusible element imbedded within the mass of arc extinguishing material and connecting said terminals, and a mass of chlorinated naphthalene in said holding means.

5. As an article of manufacture, a renewable fuse comprising a fuse cartridge consisting of a fusible member encased in a filling of chlorinated naphthalene and having terminal members projecting from said cartridge, a mounting therefor consisting of a cup-like body conforming to the contour of said cartridge with terminal pieces projecting from opposite ends of the body, to which pieces said cartridge terminal members are attached, and a casing surrounding said cartridge and body, from which casing said terminal pieces project.

6. In combination with a fuse cartridge having a fusible member whose middle portion is encased in a body of chlorinated naphthalene and whose end portions form terminals projecting therefrom, a mounting comprising knife blade terminal members spaced apart by a cradle in which said cartridge rests, means for fastening said terminals to said knife blade members, and means removably supported on said members for encasing said cartridge and cradle.

7. In combination with a fuse cartridge having a fusible member whose middle portion is encased in a body of chlorinated naphthalene and whose end portions form terminals projecting therefrom, a mounting comprising knife blade terminal members spaced apart by an insulating cradle in which said cartridge rests, means for fastening said terminals to said knife blade members, and means removably supported on said members for encasing said cartridge and cradle.

8. In combination with a fuse cartridge having a fusible member whose middle portion is encased in a cylindrical body of chlorinated naphthalene and whose end portions form terminals projecting therefrom, a mounting comprising knife blade terminal members spaced apart by a semi-cylindrical insulating cradle in which said cartridge rests, means for fastening said terminals to said knife blade members, and means removably supported on said members for encasing said cartridge and cradle.

9. As an article of manufacture, a fuse comprising a casing having removable ends, contact strips extending from said ends, an insulating cradle within said casing supported on the inner ends of said contact strips, and a fuse cartridge supported in said cradle and having terminals electrically connected to said contact strips.

10. In combination with a fusible metal encased in a body of chlorinated naphthalene and projecting from the ends thereof, an open end insulating tube into which said body fits, a metal expulsion chamber attached to one end of said tube, a plug attached to one of the projecting parts of said fuse and threaded into said chamber to close it, a metal ferrule attached to the outside of the other end of said tube, and means for attaching the other of said projecting ends of the fuse to said ferrule without closing the end of said tube to thereby permit the pressure formed by an arc in said naphthalene to expel said body from the tube.

11. In an expulsion type fuse, an insulating tube, a metal expulsion chamber attached to one end of said tube, said chamber having a threaded opening opposite the end of said tube, a metal band or ferrule encircling the other end of said tube, a fuse cartridge comprising a fusible strip encased in a body of chlorinated naphthalene, a threaded plug attached to one end of said strip, said plug being threaded into said opening to close the expulsion chamber when said cartridge is in place, and a contact strip attached to said fusible strip and ferrule, said strip leaving the end of the tube open to permit expulsion of the naphthalene body by the gases formed therein by the fusing of said fusible strip.

12. In an expulsion fuse, an outer tube with an expulsion chamber attached at one end thereof, a ring or ferrule encircling the other end of said tube, a fusible element attached to said ferrule and chamber, an inner tube loosely fitted in said outer tube and surrounding that portion of the fusible element within said chamber, and a filler within said inner tube and around said fusible member, said filler being volatilized by the arc formed by the fusing of said element to form an arc quenching gas, the pressure of which expels said inner tube from said chamber through said outer tube to thereby separate the ends of said fusible element to expedite the extinction of said arc by said gas.

13. In an expulsion fuse having an expulsion chamber closed at one end by a removable plug, an open ended tube extending from said chamber, a fuse cartridge in said chamber, a connection between one end of said fuse cartridge and said plug, a ferrule surrounding the open end of said tube, a connection between the opposite end of said cartridge and said ferrule, and means within said cartridge acted upon by the arc caused by the fusing of said fuse to form an arc quenching gas the pressure of which expels said cartridge from said chamber through said tube.

14. In combination, a fuse casing comprising a sleeve of insulation having encircling external terminals mounted upon the ends thereof, a fuse within said casing adjacent one end thereof for connecting said terminals, means connecting said fuse to said external terminals, said means including a rodlike terminal, and an elongated body of a solid crystalline material surrounding one end of said fuse and said rodlike terminal, said body lying within the bore of said one end of the sleeve and being adapted under the action of the arc formed upon blowing of the fuse to evolve a fluid having high arc extinguishing properties, said rodlike terminal being free to move toward the other end of the sleeve for lengthening the arc and thereby to bring more of the arc extinguishing material within the influence of the arc.

15. In combination, a fuse casing comprising a sleeve of insulation having encircling metallic members mounted upon its ends forming external electrical terminals, a fusible link within and adjacent one end of said casing, a body of solid crystalline compound surrounding said link and extending a substantial distance beyond one end thereof and toward the other end of the casing, a rodlike metallic internal terminal extending through a portion of said body and being connected to the adjacent end of the fuse, said internal terminal having electrical connection with the external terminal at the other end of the casing and being movable upon blowing of the fuse toward said other end of the casing to lengthen the arc and to extend its influence upon said compound, said compound being resolved by the heat of the arc formed upon blowing of the fuse to liberate a gaseous medium effective to extinguish the arc.

16. In combination, a fuse casing comprising a tube of insulating material, external terminals fixed on the tube, a pair of internal terminals connected to the external terminals, a fusible link between the internal terminals, one of said internal terminals being movable away from the other internal terminal upon melting of the fuse link, means for automatically separating said terminals upon melting of the fusible link, and a self-sustaining body of solid arc extinguishing material having a bore within which the arc is drawn by separation of said internal terminals, said arc extinguishing material being heated by the arc to liberate an arc extinguishing fluid in said bore.

17. In combination, a fuse casing comprising a sleeve of insulation having metallic members upon the ends thereof forming external circuit terminals, a fusible link within said casing, a self-sustaining body of a solid arc extinguishing material substantially filling the bore of a part of the casing and surrounding the fuse, said solid arc extinguishing material being affected by the heat of the arc to liberate an arc extinguishing medium of great effectiveness, a metallic fuse terminal extending through a part of said body of arc extinguishing material and being connected to an adjacent end of the fuse, the remainder of the bore of the tube being free to permit retraction of said fuse terminal upon blowing of the fuse, and a spring for retracting said terminal to lengthen the arc and bring a greater part of said body of arc extinguishing material within the influence of said arc.

18. In combination, a fuse casing comprising a sleeve of insu'ation having metallic members upon the ends thereof forming external circuit terminals, a fusible link within said casing, a self-sustaining body of solid arc extinguishing material substantially filling the bore of a part of the casing and surrounding the fuse, said solid arc extinguishing material being affected by the heat of the arc to liberate an arc extinguishing fluid of great effectiveness, a metallic fuse terminal ertending through part of said body of material and being connected to an adjacent end of the fuse, the remainder of the bore of the tube being free to permit retraction of said fuse terminal upon blowing of the fuse, and a spring for moving said terminal to lengthen the arc within said body of material, said terminal being drawn through the body of material whereby the arc acts upon a greater part of the body of material and is subjected to greater arc extinguishing action at the same time that its length is increased.

19. In combination, a pair of terminals, a fuse connected between said terminals, a self-sustaining body of solid arc extinguishing material disposed adjacent the fuse and adapted when subjected to the arc to evolve an arc extinguishing medium, and means for separating said terminals upon blowing of the fuse.

20. In combination, a fuse casing, a fuse in the casing, a surrounding tubular body of self-sustaining solid arc extinguishing material defining a fuse chamber, said material being adapted, under the influence of the arc, to evolve a gaseous arc extinguishing medium, and an adjacent chamber communicating with the fuse chamber and into which gaseous medium evolved from the body of material is adapted to be projected, whereby the motion of the gaseous medium relative to the arc is beneficial in extinguishing the arc.

21. In combination, a pair of fuse terminals, a fuse between them, a spring free to separate said terminals to extend the length of an arc formed upon blowing of the fuse, and an elongated self-sustaining hollow body surrounding the fuse and within the bore of which the arc is adapted to be lengthened, for evolving from the inner walls thereof by the heat of the arc a gaseous arc extinguishing medium, said hollow body confining and directing the flow of the gaseous medium into the arc and longitudinally of the bore of the body.

22. In combination, a pair of terminals, a fuse connected between said terminals, a body of self-sustaining crystalline compound disposed adjacent the fuse and adapted when subjected to the heat of the arc to evolve an arc extinguishing medium means cooperating with said body to direct the arc extinguishing medium into the arc, and a spring for separating said terminals upon blowing of said fuse.

23. In combination, a pair of terminals between which an arc is adapted to be formed, a surrounding casing substantially embracing the arc said casing comprising, a crystalline self-sustaining solid which by action of the arc liberates fluids which have high arc extinguishing properties and constituting means to inject these fluids at high velocity laterally into the arc, and means for separating the terminals.

24. In a fuse, a tubular self-sustaining solid having a bore, the walls of which comprise a self-sustaining surface of an arc extinguishing compound from which, by the action of an arc, a gaseous arc extinguishing medium is evolved, fuse terminals and a fuse between said terminals, said fuse upon being blown forming an arc within said tubular bore, said gaseous medium filling the said bore and being driven out of one end thereof to extinguish the arc.

25. In a protective device of the class described, a tubular housing comprising ferrules constituting external terminals, a pair of internal terminals, a spring connected to one of the internal terminals for separating the same, a fuse connected between said internal terminals, and means for supplying a gaseous arc extinguishing medium to extinguish the arc upon blowing of the fuse, said means including a tubular member providing a self-sustaining surface of solid arc extinguishing material adapted to be acted upon by the arc to release gaseous arc extinguishing material and to extinguish the arc upon moderate overload, and a second tubular member of larger bore than the first tubular member adapted, in the case of heavy overload, to be acted upon by the arc and to evolve gaseous arc extinguishing material for extinguishing the arc therein.

26. The method of interrupting current flow through a fuse, which comprises blowing the fuse to vaporize the metal of the same, establishing an arc through said metallic vapor, laterally confining the arc, injecting a gaseous medium of relatively low arc sustaining character into the laterally confined space occupied by said arc so long as the arc persists and thereby driving out the metallic vapor and supplanting it with said gaseous medium.

27. The method of extinguishing an arc, which comprises laterally confining the arc, evolving a gaseous arc extinguishing medium by the action of the heat of the arc, said gaseous medium sweeping out of said laterally confined space metallic vapors released by the arc and supplanting them by said gaseous medium so long as the arc continues.

28. The method of extinguishing an arc, which comprises laterally confining the arc in the presence of a deionizing agent to cause evolution of gaseous medium the pressure of which rises and creating a rapid flow of said gaseous medium substantially longitudinally of the arc to drive out metal vapors and break up and deionize the arc.

29. In a device of the class described, the combination of a fuse housing having metallic ferrules of a tubular explosion chamber within said housing, a fusible link within said housing, there being an arc extinguishing material subject to the action of the arc caused by blowing of the fuse for forming within the explosion chamber a gaseous arc extinguishing medium which sweeps out of the explosion chamber the metallic vapors of the fused link and supplants it with a medium of lower arc sustaining character.

30. In a device of the class described, the combination of a fuse housing having metallic ferrules of a tubular explosion chamber within said housing, a fusible link within said housing, there being an arc extinguishing material subject to the action of the arc caused by blowing of the fuse for forming within the explosion chamber a gaseous arc extinguishing medium which sweeps out of the explosion chamber the metallic vapors of the fused link and supplants it with a medium of lower arc sustaining character, and means for automatically extending the length of the arc upon melting of said link.

31. The method of interrupting current flow through an arc, which comprises continuously evolving by the heat of the arc an arc extinguishing medium so long as the arc persists, directing said medium into the arc, confining a portion of said medium in contact with the arc against movement laterally of the arc while permitting movement of the medium longitudinally of the arc to displace the conducting gases of the arc longitudinally.

32. The method of interrupting current flow through a fuse, which comprises blowing the fuse to vaporize the metal of the same, establishing an arc through said metallic vapor, subjecting to the heat of the arc a material capable of evolving an arc extinguishing medium, continuously evolving said medium so long as the arc persists, and creating a continuous blast of said medium longitudinally of the arc so long as the arc persists, to displace the conductive vapor of the arc longitudinally of the arc.

33. The method of interrupting current flow through a fuse, which comprises maintaining alongside the fuse a material capable of evolving a gaseous arc extinguishing medium when subjected to the heat of an arc, blowing the fuse to vaporize the metal of the same, establishing an arc through said metallic vapor, evolving continuously from said material by the heat of the arc a gaseous arc extinguishing medium, and confining said gaseous medium against lateral flow away from the arc while permitting flow of said medium longitudinally of the arc.

34. The method of interrupting current flow through a fuse, which comprises maintaining alongside the fuse a material capable of evolving a gaseous arc extinguishing medium when subjected to the heat of an arc, blowing the fuse to vaporize the metal of the same, establishing an arc through said metallic vapor, evolving from said material by the heat of the arc a gaseous arc extinguishing medium, confining said gaseous medium against lateral flow away from the arc while permitting flow of said medium longitudinally of the arc, and separating the terminals of the arc to extend the length of the arc to subject more of the aforesaid material to the heat of the arc and thereby accelerating the evolution of said medium and the longitudinal flow thereof.

35. The method of interrupting current flow through a fuse, which comprises blowing the fuse by current flow therethrough, establishing an arc through the metal vapor, confining the lateral expansion of said metal vapor and permitting longitudinal expansion of the same, continuously absorbing the heat of the arc so long as the arc persists by an arc extinguishing material, continuously evolving from said material by said absorbed heat a gaseous arc extinguishing medium, and directing the gaseous arc extinguishing medium longitudinally of the arc to displace said metallic vapors of the arc.

36. In combination, a fuse housing, a pair of terminals disposed therein, a fuse connected between said terminals, arc extinguishing material disposed within the housing being directly exposed to the arc formed upon blowing of the fuse, said material, upon blowing of the fuse and formation of an arc between the terminals, being converted into a gaseous arc extinguishing medium and being discharged into the arc, and tubular means within said housing, said means surrounding a part of the arc and producing a condition of higher pressure of said medium at one point on the length of the arc than at another, whereby flow of the gaseous arc extinguishing medium through said tubular means longitudinally of the arc is created and maintained so long as the arc persists.

37. In combination, a housing, a pair of terminals therein, a fuse between the terminals, a spring for moving one of the terminals away from the other when the fuse is blown, a tubular body in the housing, said body having a bore embracing a part of the arc, and a mass of arc extinguishing material, said body presenting said arc extinguishing material to the heat of the arc to cause said material to release an arc extinguishing medium which is directed into the arc within the bore to expel the conducting gases of the arc longitudinally out of said bore.

38. In a protective device of the class described, a tubular housing comprising ferrules constituting external terminals, a pair of internal terminals connected to said external terminals, a spring connected to one of the internal terminals for separating the one internal terminal from the other, a fuse connected between said internal terminals, arc extinguishing material within the housing, said material being subjected to the heat of the arc upon blowing of the fuse to evolve a gaseous arc extinguishing medium, and means within the tubular housing providing a first bore of reduced diameter within which the arc is formed and a second bore of larger diameter than the first bore into which latter bore the arc is extended by movement of the movable internal terminal, the arc acting upon said arc extinguishing material in both said bores for the evolution of said gaseous arc extinguishing medium so long as the arc persists.

39. In a fuse device, a sleeve of insulation, a pair of external terminals upon the ends of said sleeve, one of said terminals closing the end of the sleeve, a conductor extending longitudinally through said sleeve of insulation and connecting said terminals, said conductor comprising a fusible link at its intermediate portion, a second sleeve within said first sleeve surrounding said fusible link, and a mass of solid crystalline arc extinguishing material supported inside said second sleeve, said material absorbing heat from the arc formed upon blowing of the fuse and evolving a gaseous arc extinguishing medium which is confined against lateral expansion by said second sleeve, said second sleeve being adapted to be expelled from the end of the first sleeve by action of said gaseous medium.

In witness whereof, I hereunto subscribe my name this 18th day of August, 1932.

CLARENCE RINGWALD.